(12) United States Patent
Lelie et al.

(10) Patent No.: US 10,569,971 B2
(45) Date of Patent: Feb. 25, 2020

(54) DEVICE AND METHOD FOR THE POSITIONALLY STABLE TRANSPORT OF CONTAINERS

(71) Applicant: KHS GmbH, Dortmund (DE)

(72) Inventors: Thomas Lelie, Kleve (DE); Sebastian Pieters, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/078,762

(22) PCT Filed: Feb. 17, 2017

(86) PCT No.: PCT/EP2017/053639
§ 371 (c)(1),
(2) Date: Aug. 22, 2018

(87) PCT Pub. No.: WO2017/148713
PCT Pub. Date: Sep. 8, 2017

(65) Prior Publication Data
US 2019/0047797 A1    Feb. 14, 2019

(30) Foreign Application Priority Data

Mar. 3, 2016  (DE) .................. 10 2016 103 845

(51) Int. Cl.
*B65G 47/84* (2006.01)
*B65G 43/08* (2006.01)

(52) U.S. Cl.
CPC .......... *B65G 47/846* (2013.01); *B65G 43/08* (2013.01); *B65G 2201/0244* (2013.01)

(58) Field of Classification Search
CPC ............................. B65G 47/846; B65G 47/847
USPC ................................ 198/478.1, 480.1, 481.1
See application file for complete search history.

(56) References Cited

U.S. PATENT DOCUMENTS

| | | | | |
|---|---|---|---|---|
| 1,551,331 A | * | 8/1925 | Risser .................. | B67B 3/2033 198/480.1 |
| 2,713,960 A | * | 7/1955 | Siegal .................... | B65B 43/60 141/79 |
| 4,909,377 A | * | 3/1990 | Bernhard ................ | B08B 9/205 198/480.1 |
| 5,261,207 A | * | 11/1993 | Bedin .................. | B67C 7/0046 198/480.1 |
| 5,806,656 A | | 9/1998 | Barca | |
| 7,325,372 B2 | * | 2/2008 | Bernhard ................ | B67B 3/206 53/300 |
| 2011/0108389 A1 | | 5/2011 | Bonnain | |

FOREIGN PATENT DOCUMENTS

| | | |
|---|---|---|
| DE | 39 24 651 | 2/1991 |
| DE | 198 51 733 | 5/2000 |
| DE | 10 2012 100 810 | 6/2013 |
| EP | 0 084 495 | 7/1983 |
| FR | 1 171 558 | 1/1959 |
| WO | WO2009/129398 | 10/2009 |

* cited by examiner

*Primary Examiner* — William R Harp
(74) *Attorney, Agent, or Firm* — Occhiuti & Rohlicek LLP

(57) ABSTRACT

An apparatus for promoting rotation-free transport of containers along an arcuate path includes a belt that presses against containers carried by a transport star along that path.

18 Claims, 7 Drawing Sheets

DEVICE AND METHOD FOR THE POSITIONALLY STABLE TRANSPORT OF CONTAINERS

RELATED APPLICATIONS

This is the national stage, under 35 USC 371, of international application PCT/EP/2017/053639, filed Feb. 17, 2017, which claims the benefit of the Mar. 3, 2016 priority date of DE102016103845.8, the contents of which are herein incorporated by reference.

FIELD OF INVENTION

The invention relates to container processing, and in particular, to container transport.

BACKGROUND

It is known for a transport star to move containers along an arcuate transport path for conveyors to move containers along linear transport paths. It is also known to place these transport paths together so that containers transition from moving along an arcuate path to moving along a linear path and vice versa. A transport element interacts with a railing arrangement to assist in this transition.

A difficulty that arises is that the containers can rotate as they traverse the railing arrangement. This is particularly disadvantageous if a container's rotational position is in any way important.

For example, it may be that certain regions of a container will have features that do not extend symmetrically about the container's circumference. Examples of such features include bosses, imprints, and label regions. If a label is to be applied, the container should be facing the labeling machine with the correct orientation. Otherwise, a label might be applied on a seam or embossing instead of a smooth region. If containers are intended to be combined by adhesive into a cluster, the containers had best face the correct direction at the glue applicator lest glue be applied to the label.

SUMMARY

The invention relates to transport of containers along an arcuate transport path between a container entrance and a container exit in a way that avoids rotating the containers about their respective vertical container axes.

According to a first aspect, the invention relates to an apparatus for the rotation-free transport of containers along an arcuate transport path between a container entrance and a container exit.

As used herein, an "arcuate transport path" or "arcuate path" is a transport path that is shaped like a segment of a circle, i.e. a circular-segment-shaped transport path.

Such an apparatus includes a central control-unit, a transport star that can be driven about its rotation axis in the transport direction at a rotation speed and that has recesses provided at its outer circumference for receiving the containers, as well as a belt arrangement with an endlessly encircling securing belt that can be driven by a controllable drive device at one or more belt speeds.

The apparatus also includes a dynamic belt storage unit that dynamically interacts with the belt arrangement. An operational connection between the transport star and the securing belt suppresses rotation of containers as they traverse the arcuate path. Using the securing belt in the region of the arcuate path, it is possible to form an effective belt section with a first transport-path section that faces an unoccupied extent of the arcuate path and/or a second transport path that faces an occupied extent of the arcuate path. The unoccupied extent is one in which the recesses of the transport star are empty and the occupied extent is one along which recesses of the transport star carry containers.

In some embodiments, the apparatus includes a detector for detecting containers on the transport path and/or along a and/or angular run of the securing belt in the region of the effective belt section, and in particular, along the first and second transport-sections. Such a detector could also be arranged such that, at any point upstream of the detector, the detector detects containers and provides information concerning the extent to which the transport star is occupied by containers to a central control unit. The control unit then uses this information in an appropriate manner for regulating or controlling the drives.

In some embodiments, the drive drives the securing belt so as to synchronize the belt speed along the effective belt-section with the transport star's rotation speed. In doing so, the drive increases the belt speed as required based on how many containers are present along the arcuate path. Such adjustment of belt speed relies in part on a dynamic belt-storage unit.

The detector directly detects the contact and cessation of contact between the securing belt and the transport star or containers carried by the transport star. In a preferred embodiment, it does so optically. This permits the control unit to control a drive so as to adjust and regulate belt speed along the first transport-path.

The detector can also be arranged anywhere upstream such that the contact or releasing of the securing belt can be determined indirectly in a control unit on the basis of the status data in a portion of the transport path that precedes the detector.

An advantage of the apparatus arises from its ability to apply thrust force to containers along the arcuate path. This makes it possible to prevent a container from rotating about its vertical container axis.

The apparatus makes it possible to adjust the belt speed based on the extent to which containers occupy the arcuate transport path so that the belt speed conforms to the rotation speed of the transport star as well as the lengths of the first and/or second transport portions of the effective belt portion. This feature is especially important when one is attempting to adhesively bond containers to each other since one can then ensure that the adhesion points lie at the correct position and that they coincide with each other exactly when it is time to press containers together to adhesively join them.

The use of a securing belt that travels with the container as it guides the container's motion along the arcuate path also means that there is no relative motion between the guide and the container, as there would be if a rail were used for this purpose. This means that there will be no rubbing of sensitive container surfaces such as labels and imprints as a moving container slides along a stationary guide rail.

In some embodiments, the first and/or second transport-path sections have a length that varies based on how many containers are being conveyed along the arcuate path. These lengths can vary all the way down to zero so that it is possible to have an effective belt-section formed that has only one of the first and second transport-sections.

In some embodiments when the arcuate path is empty, the effective belt-section has only a first transport-section. This first transport-section contacts the transport star. A drive drives the belt so that its belt speed matches the circumferential speed of the transport star at a first radius.

As the arcuate path fills with containers, a second transport-section forms. The drive then drives the belt so that the belt speed along the second transport-section matches the circumferential speed of the transport star at a larger radius that depends in part on the container diameter. This can be carried out by dynamically adjusting the belt length of the effective belt-section in the region of the second transport-path as the arcuate path fills with containers.

In another embodiment, the control unit compensates for a change in speed that arises from having detected that the securing belt in the region of the first transport-section has lifted off the transport star.

In another embodiment, when the arcuate path is completely filled with containers and the second transport-section forms the entire effective belt-section, the drive drives the belt at a speed that matches the circumferential speed of the transport star at a radius that corresponds to where the effective belt-section contacts the containers.

This embodiment can also be configured in the converse manner, in that, directly by means of a drive unit, a partially increased belt speed is initiated and in parallel the maintaining constant of the belt speed in the other transport or belt section takes place by way of the position change of the dynamic belt storage unit.

In this situation, in an analogous manner, the dynamic belt storage unit then also compensates, by position change, for the speed change in the belt or transport path when the securing belt lifts from the surface or surface regions, and a retensioning of the securing belt is required.

As used herein, "container" refers to all packaging means, in particular bottles, cans, etc.

As used herein, "guide belt" includes segmented and non-segmented belts, in particular also link belts.

As used herein, "positionally stable" transport, or "rotation-free" transport of a container refers to transport of that container in such a way that it does not rotate about a vertical container axis thereof. The expression "essentially" or "approximately" signifies in the meaning of the invention deviations from the exact value in each case by ±10%, preferably by ±5%, and/or deviations in the form of changes which are not of significance for the function.

Further embodiments, advantages, and possible applications of the invention are also derived from the following description of exemplary embodiments and from the figures. In this situation, all the features described and/or graphically represented are in principle the object of the invention, alone or in any desired combination, regardless of their inclusion in the claims or reference to them. The contents of the claims are also deemed a constituent part of the description.

BRIEF DESCRIPTION OF THE DRAWINGS

These and other features will be apparent from the following detailed description and the accompanying figures, in which.

For elements of the invention that are the same or have the same effect, identical reference numbers are used in the figures. Moreover, to avoid visual clutter, each figure omits certain reference numerals that are not necessary for the discussion of that figure.

DETAILED DESCRIPTION

Figure 1:
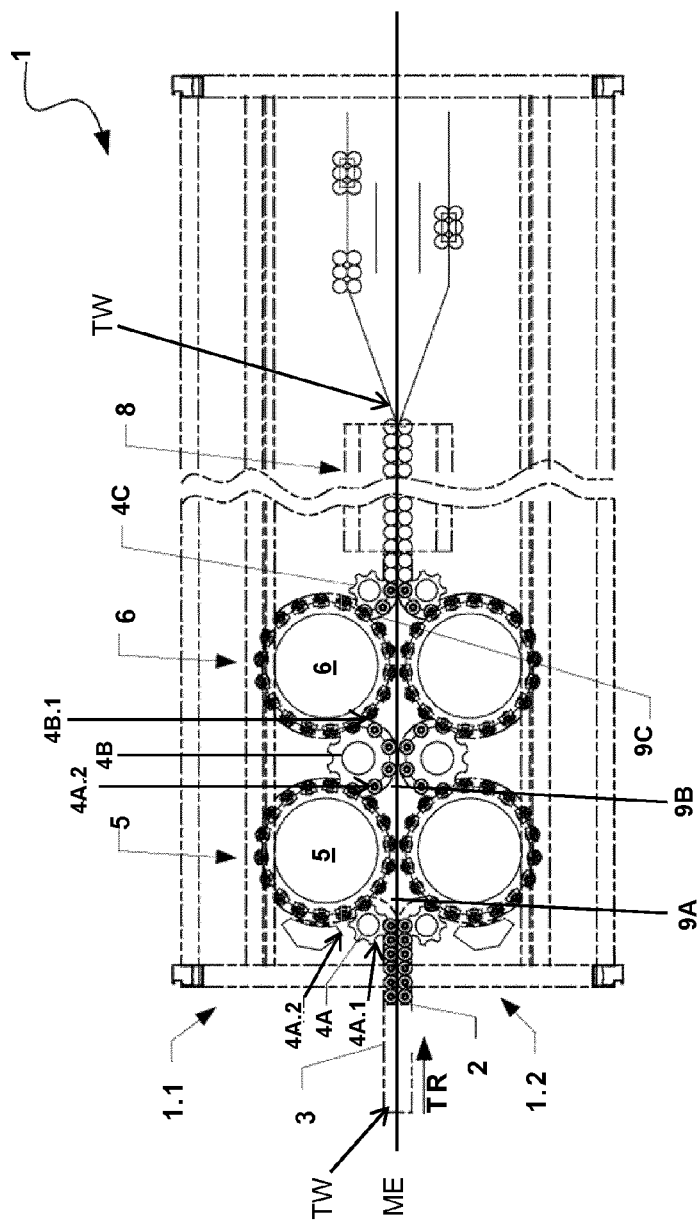
FIG. 1 shows a container treatment machine having treatment modules connected to a treatment unit.

FIG. 1 shows a container-treatment device 1 for producing multi-row clusters of standing containers 2 by adhesively connecting containers 2 to one another. A standing container is a container that rests on its base with its container axis aligned vertically.

Although the apparatus and methods described herein are useful in connection with such a container-treatment device, they are by no means limited to such a device. In fact, the apparatus and methods described herein are applicable to any container-treatment device 1 that requires lateral guidance for containers 2 moved in a transport direction along an arcuate transport path.

The illustrated container-treatment device 1 simultaneously processes two single-track container-flows. To do so, the container-treatment device 1 has two counter-working processing regions that are symmetrically placed on either side of a horizontally extending mid-plane ME shown in FIG. 1.

To avoid repetition, only the configuration and mode of function of the first processing region 1.1 is described. The second processing region 1.2 is similar in structure and function. It will also be apparent from the following discussion that the apparatus and methods described herein are applicable to a container-treatment device 1 that processes only a single-row container flow.

As shown in FIG. 1, a transporter conveys standing containers 2 along a transport path TW in a transport direction TR toward a container entrance 4A.1 of a first star 4A.

The illustrated apparatus features first and second container-treatment module 5, 6, referred to herein as first and second "treatment modules" for brevity.

In some embodiments, the first treatment-module 5 is an alignment module at which the containers 2 are aligned in accordance with a container feature and the second container-treatment module 6 is a closure module that closes containers 2. In other embodiments, the second treatment-module 6 is an adhesive applicator that applies an adhesive onto a container's outer surface to permit containers 2 to adhesively bond to each other to form container groups, thereby forming container clusters.

Following the first star 4A, the containers 2 are transferred via a container exit 4A.2 to the first treatment module 5. The first treatment module 5 comprises a rotor that rotates about a vertical axis. Between the container entrance 4A.1 and the container exit 4A.2, the first star 4A forms an arcuate transport path.

A second star 4B receives containers 2 at the container exit 4A.2 and transfers the containers 2 to the second treatment module 6. The second treatment-module 6 comprises a rotor that rotates about a vertical axis. Between the container exit 4A.2 and a container entrance 4B.1 the second star 4B forms an arcuate transport path and transfers containers from the first treatment module 5 to the second treatment-module 6.

Next, after having passed through the second treatment-module 6, the containers 2 are conveyed to the third star 4C, which proceeds to transfer them to a treatment unit 8. The third star 4C comprises a container entrance 4.1, a container exit 4.2, and an arcuate transport path formed between the container entrance 4.1 and the container exit 4.2.

In some embodiments, the treatment unit 8 is a grouping device that forms container clusters, each of which has at least two rows of containers. In these embodiments, the treatment unit 8 includes a conveyor belt or chain that transports the containers 2 linearly. This differs from the motion of the containers 2 along curved transport paths in the first and second treatment-modules 5, 6.

There are several ways to transfer containers 2 from the arcuate transport-path in the region of the first and second treatment modules 5, 6, to the linear transport path in the region of the treatment unit 8.

In one embodiment, shown in FIG. 1, each star 4A-4C has recesses on its circumference. These recesses form container pockets that take up containers and move them along an arcuate path as the star 4A-4C rotates.

First, second, and third railings 9A-9C disposed in sections around the stars 4A-4C prevent radial deviation of the containers 2 as they traverse their respective arcuate paths. As the star 4A-4C turns, it slides containers 2 along the corresponding railing 9A-9C. The railing 9A-9C constrains the containers 2 to stay on the arcuate path as they traverse an angular range. A disadvantage of this method is that containers are apt to also rotate as they slide along the railing 9.

Figure 2:
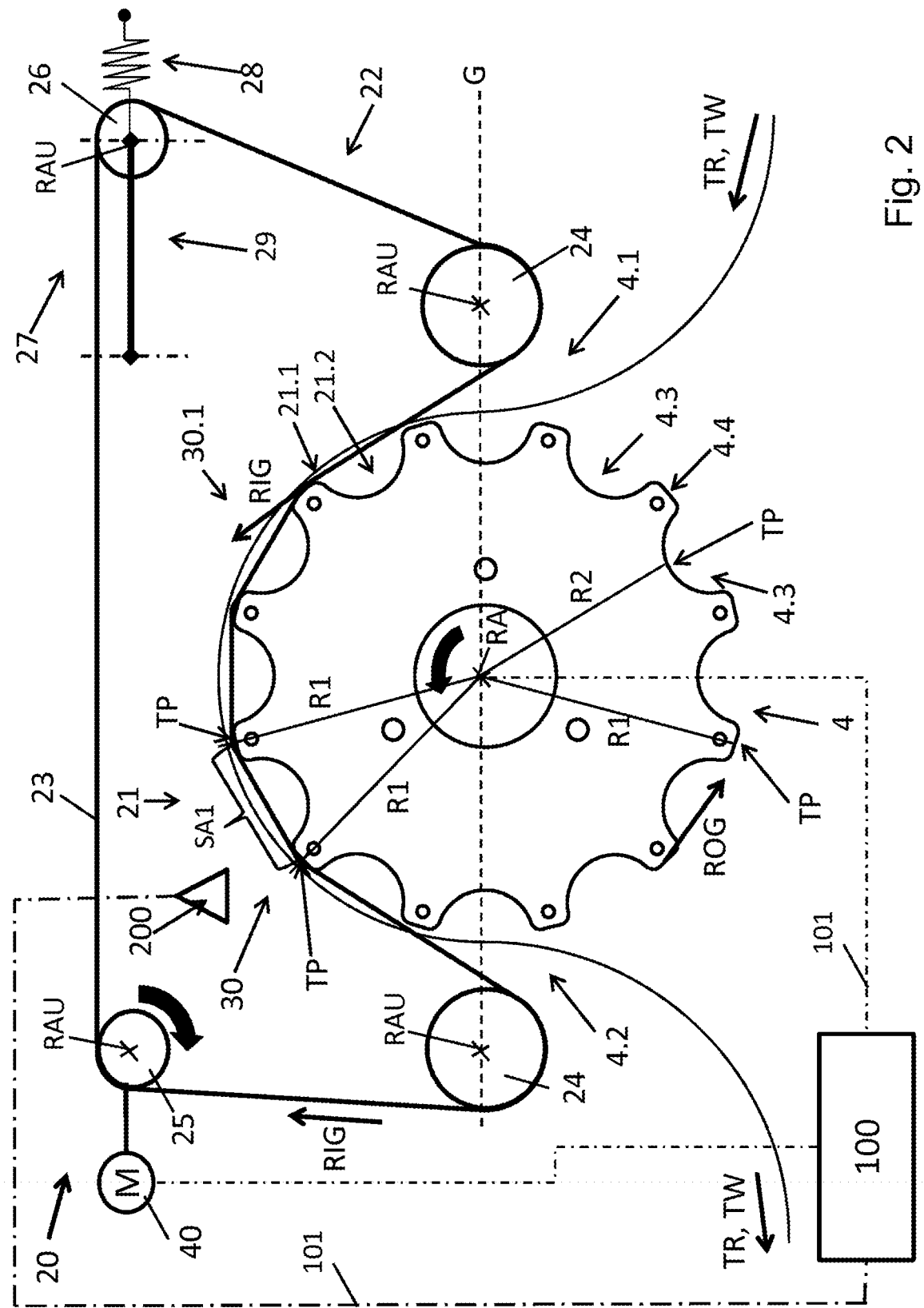
FIG. 2 shows empty arcuate path.

FIG. 2 shows an alternative embodiment in which a device 20 carries out rotation-free transport of containers 2 along an arcuate path 21 that extends between the container entrance 4.1 and the container exit 4.2.

As can be seen in FIG. 2, the transport star 4 comprises recesses 4.3 formed along a circumference thereof. Each recess 4.3 forms a pocket that holds a container 2. The recesses 4.3 are at approximately identical angular distances about the rotation axis RA at the outer circumference of the transport star 4. Each recess is shaped like an arc of a circle. In a preferred embodiment, the recesses 4.3 have identical arc lengths and mid-point angles.

Between each pair of adjacent recesses 4.3 there is a flattened star tip 4.4 having a tangent point TP. The set of all tangent points TP from all the star tips 4.4 defines an outer circle centered at the rotation axis RA and having a first radius R1. Each recess 4.3 likewise has a tangent point TP at which it makes its closest approach to the rotation axis RA. The tangent points TP for all the recesses 4.3 define an inner circle centered on the rotation axis RA and having a second radius R2.

A drive, such as a servomotor, rotates the transport star 4 shown in FIG. 2 counter-clockwise around its rotation axis RA at a constant rotation speed ROG. A central controller 100 controls or regulates this rotation speed ROG. In some embodiments, the central controller 100 is a constituent part of a central machine-control system. A control line 101 provides communication between controller 100 and the transport star's drive.

Also shown in FIG. 2 is a belt arrangement 22 beside the star 4. The belt arrangement 22 has an endlessly circulating securing belt 23 made of a flexible material. Suitable materials are those that include some rubber, such as rubber fabric. Ideally, the material is one that avoids stretching under a tensile load. This permits the securing belt 23 to exert a thrust force onto the outer casing surface of a container 2.

The arcuate path 21 extends in the transport direction TR between the container entrance 4.1 and the container exit 4.2 of the transport star 4 and therefore forms part of the transport path TW. The securing belt 23 delimits an outer side 21.1 of the arcuate path 21. The recesses 4.3 adjacent to the arcuate path 21 delimit an inner side 21.2 of the arcuate path 21.

The belt arrangement 22 includes two deflection rollers 24, a drive roller 25, and a belt-store roller 26. These cooperate to ensure that the securing belt 23 circulates endlessly with a direction of rotation opposite that of the star's direction of rotation. Each roller 24, 25, 26 rotates about a corresponding rotation axle RAU. The two deflection rollers 24 guide the securing belt 23 along the arcuate path 21 in such a way that the securing belt 23 engages containers along a portion of the start's circumference, As it does so, the securing belt 23 exerts a thrust force that tends to suppress rotation of the containers 2 as they traverse the arcuate path 21.

A control line 101 connects the control unit 100 to a drive 40 that drives the drive roller 25 in a controlled and/or regulated manner. In some embodiments, a servomotor implements the drive 40. In particular, the control unit 100 causes the drive 40 to vary belt speed to be take on a value equal to a nominal belt-speed RIG, a first belt-speed RIG1, or a second belt-speed RIG2 based on the transport star's rotation speed ROG.

The portion of the securing belt 23 that that faces the transport star 4 is referred to herein as the "effective belt-section 30."

Figure 3:
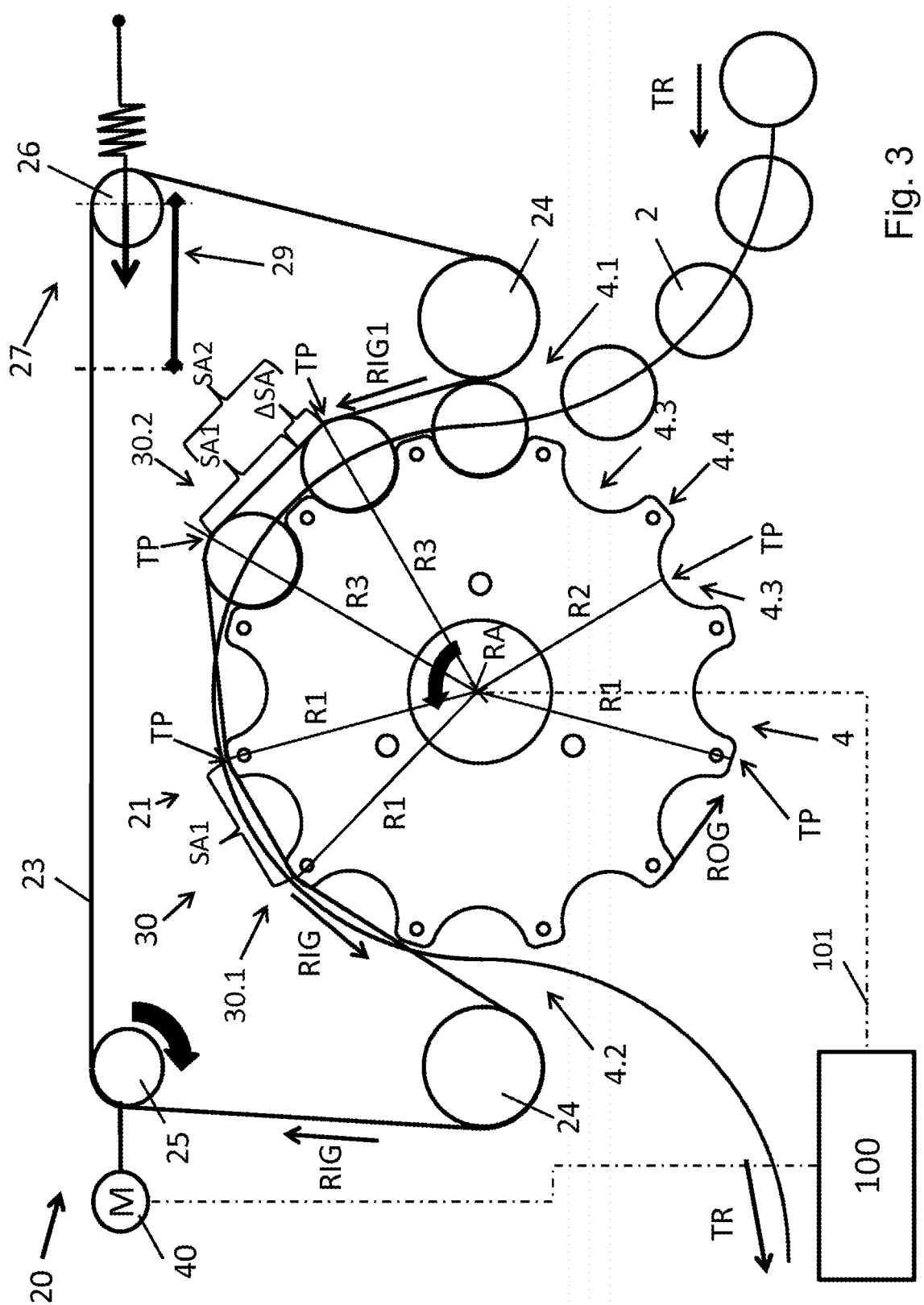
FIG. 3 shows a partly-filled arcuate path.
Figure 4:
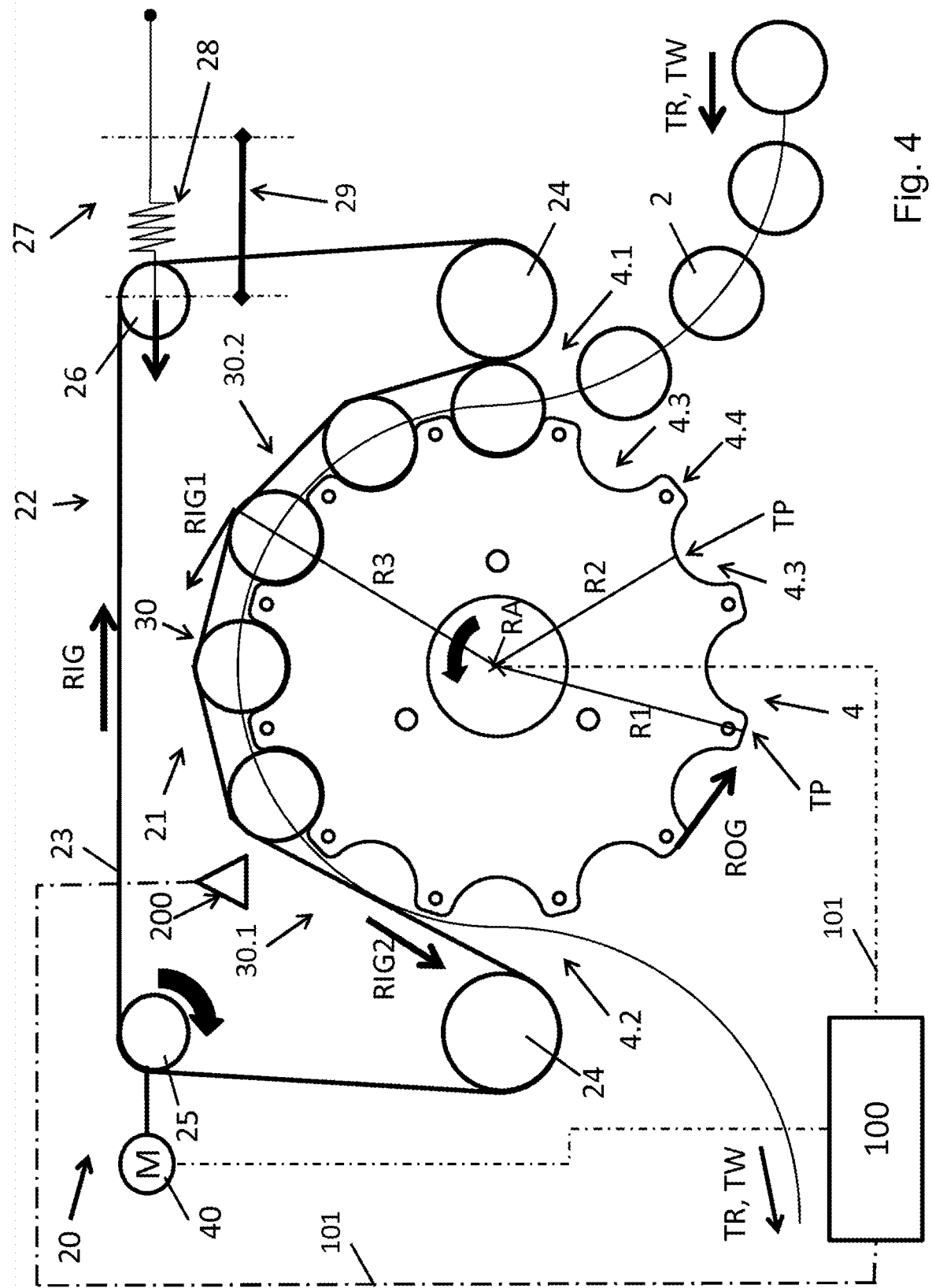
FIG. 4 shows an arcuate path that has been filled enough to cause the belt to lift off a star.
Figure 5:
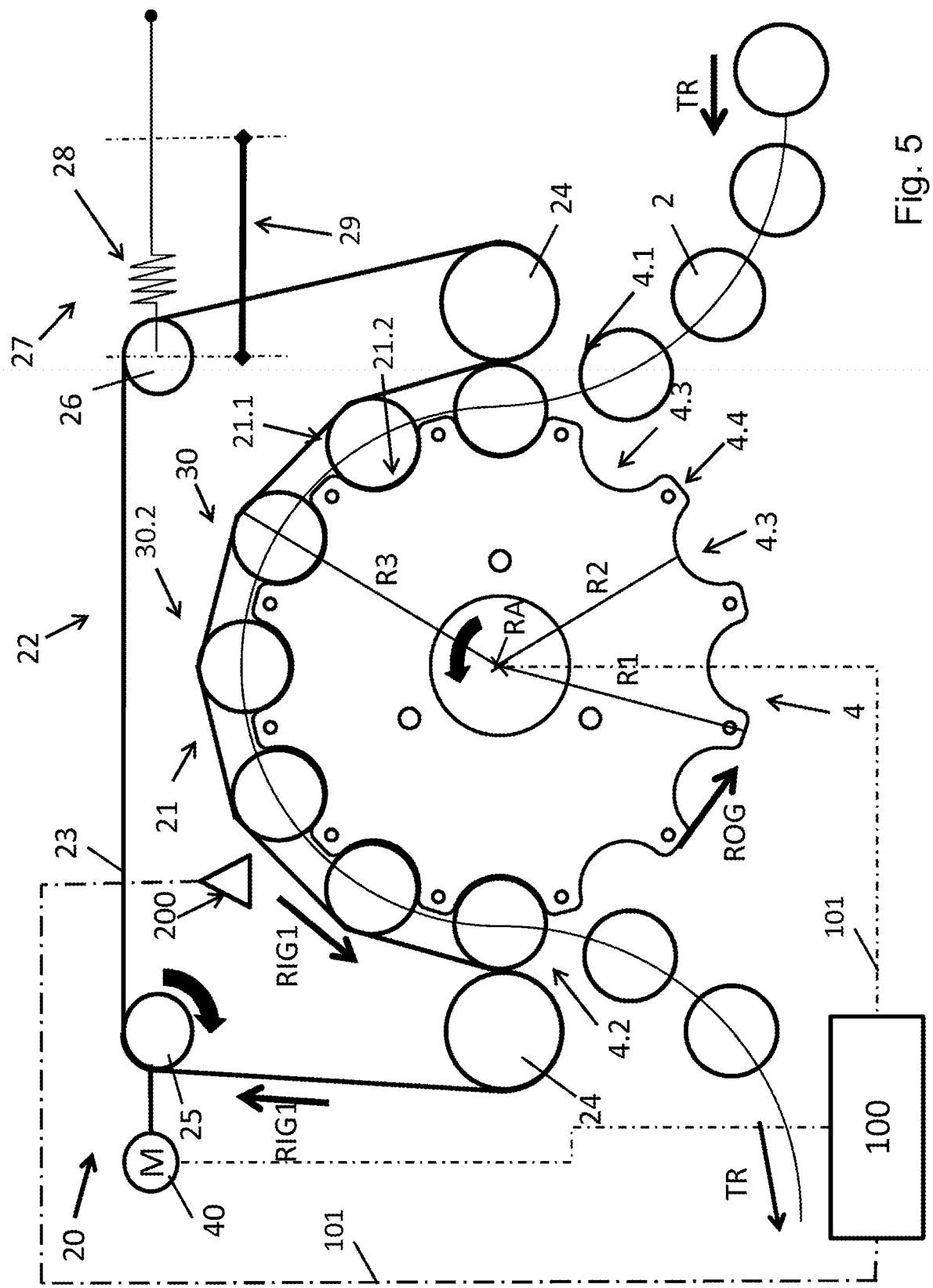
FIG. 5 shows a filled arcuate path.

In general, not every recess 4.3 that faces the effective belt-section 30 will be carrying a container. FIGS. 3-5 show examples of different levels of occupancy. Thus, in general, part of the effective belt-section 30 faces an unoccupied extent of the transport star 4 and the remaining part of the effective belt-section 30 will face an occupied portion of the transport star 4. That portion of the effective belt-section 30 facing the unoccupied extent of the transport star 4 is referred to here as the "first transport-section 30.1." That portion of the effective belt-section 30 facing the occupied extent of the transport star 4 is referred to here as the "second transport-section 30.2." Thus, when the transport star 4 is empty, as shown in FIG. 2, there is no second transport-section 30.2. Conversely, when the transport star 4 is completely occupied, as shown in FIG. 5, there is no first transport-section 30.1. When the transport star 4 is partly occupied, as shown in FIGS. 3 and 4, both the first and second transport-sections 30.1, 30.2 exist. As can be seen by comparing FIGS. 3 and 4, the relative lengths of the first and second transport sections 30.1, 30.2 depend on how many of the recesses 4.3 are carrying containers 2.

As can be seen in FIGS. 3 and 4, the first transport section 30.1 contacts the star tips 4.4 and the second transport section 30.2 contacts the containers' outer casings at corresponding tangent points TP. These tangent points TP define a circle having a third radius R3 that is the sum of the second radius R2 and the container's diameter.

If the drive 40 drives the belt 23 synchronously with the star 4, the second transport section 30.2 exerts a radially inward force against the containers 2 that it contacts. This force, when coupled with the synchronous speeds, prevents the containers from rotating as they traverse the arcuate path 21.

As the star's occupancy level increases and decreases, the belt 23 may have a tendency to slacken or tighten. This affects the thrusting force. A dynamic belt-storage unit 27 includes a belt-storage roller 26 that dynamically adjusts belt length to compensate for changes in belt speed as the second transport-section 30.2 changes in extent. In particular, the dynamic belt-storage unit 27 compensates for an increase in the belt speed RG1 that is required for the rotation-free supply of containers 2 to the arcuate path 21 in the second transport section 30.2 depending on the number of containers 2 present in the second transport section 30.2.

A tension spring 28 or alternatively, a pneumatic cylinder, pretensions the belt storage-roller 26. Additionally, the belt-storage roller 26 moves linearly along an adjustment rail 29 for linear adjustment thereof.

The dynamic belt-storage unit 27 thus compensates for variation in the extent of the second transport section 30.2 based on the arcuate path's level of occupancy. This is carried out in part by having the belt-storage roller 26 move along the adjustment rail 29 against a pre-tension force such that a change in the belt's speed RG1 adjusts the extent of the second transport section 30.2.

The belt-storage roller 26 is dynamically movable along the adjustment rail 29 against the spring force of the tension spring 28. It does so in a way that adjusts the extent of the second transport-section 30.2 to correspond to the number of containers 2 being transported along the arcuate path 21. The adjustment is such as to ensure rotation-free container transport by adjustment of the second transport-section's extent and increasing the belt speed in the second transport-section 30.2 to a first belt-speed RIG1 that is greater than the nominal belt speed RIG in the first transport section 30.1.

The differential belt speed arises because the circumferential speed of a rotating circle increases with increasing radius of the circle. It can be seen in FIG. 3 that the first transport path-section 30.1 keeps pace with the circumferential speed of a rotating circle having a radius equal to the first radius R1 whereas the second transport path-section 30.1 keeps pace with the higher circumferential speed of a rotating circle having a slightly larger radius equal to the third radius R3.

In particular, in this situation, use is made of the connection of the travel path covered per specified time unit, which defines a clear and definite speed. By dynamically providing belt length using the dynamic belt-storage unit 27, the path distance covered by a tangent point TP at the third radius R3 of a container 2 received in the second transport section 30.2 is lengthened by the identical time unit, thus marginally increasing speed.

Two further deflection rollers 24 assist in guiding the belt 23 along the arcuate path 21. The two deflection rollers 24 are arranged on either side of the star 4 such that the rotation axis RA of the star 4 is on the midpoint of a line G joining the their respective rotation axes RAU.

In such a case, there exist embodiments in which the effective belt section 30 is formed by a belt section that, depending on the nominal belt speed RIG, is located, at a defined time, between the container entrance 4.1 and the container exit 4.2, and, specifically, the belt section that, at a defined time and on the side facing the rotation axis RA, intersects a straight line G between the container entrance 4.1 and the container exit 4.2.

FIG. 4 shows an embodiment that also has a detector 200 that communicates with the central controller 100 to provide a signal indicative of containers 2 on either the transport path TW or along the effective belt section 30, and in particular, along the first and second transport-sections 30.1, 30.2. However, there is no requirement that the detector 200 only be able to detect containers along the arcuate path 21. It is also possible for the detector 200 to detect containers 2 in sections of the transport path TW that are upstream of the arcuate path 21.

In a preferred embodiment, the detector 200 detects a release or raising of the belt 23 from the star 4, and in particular from the star tips 4.4, along the first transport section 30.1.

In some embodiments, the detector 200 is configured as an optical detector that is arranged to detect containers 2 that are located on the first transport section 30.1, the securing belt 23, and the rotation-angle dependent section of the transport star 4 in operational connection in the effective belt-section 30, and in particular, the star's star tips 4.4. Such a detector 200 is ideally placed to detect when the securing belt 23 and the star tips 4.4 lose contact with each other.

FIG. 2 shows an unoccupied arcuate path 21. As a result, the effective belt section 30 lies along the entire arcuate path 21 in contact with the star tips 4.4. Since the arcuate path 21 is unoccupied, the first transport-section 30.1 forms the entire effective belt-section 30. Between any adjacent star tips 4.4 the first transport-section 30.1 defines a first chord SA1. There is no second transport-section 30.2 when the arcuate path 21 is unoccupied.

When the arcuate path 21 is unoccupied, the drive 40 drives the securing belt 23 at a nominal belt speed RIG at a belt speed that matches the rotation speed ROG of the transport star 4 but in the opposite direction. This speed matches the circumferential velocity of a star tip 4.4. As a result, there is no relative movement between the star tips 4.4 and the securing belt 23.

In addition the arcuate path 21 is unoccupied, the spring 28 pre-tensions the belt-storage roll 26 but the belt-storage roll 26 remains undeflected.

In FIG. 3, the arcuate path 21 has begun to fill with containers 2. The securing belt 23 continues to be driven at the nominal belt speed RIG corresponding to the rotation speed ROG, which corresponds to the circumferential speed of the transport star 4 measured at the star tips 4.4 at the first radius R1. Since the arcuate path 21 is no longer empty, a second transport-section 30.2 has formed and the first transport-section 30.1 has become shorter.

The second transport-section 30.2 forms a second chord section SA2 that extends between two adjacent tangent points TP at which the second transport-section 30.2 contacts adjacent containers 2. This second chord SA2 is longer than the first chord SA1 by a chord differential $\Delta SA$. The chord differential $\Delta SA$ corresponds to the length section by which the dynamic belt-storage unit 27 dynamically lengthens the second transport section 30.2 as a container 2 runs into the effective belt section 30.

The dynamic belt-storage unit 27 dynamically adjusts the length of the effective belt section 30 as a container 2 enters the arcuate path 21 from the container entrance 4.1 and the second transport-path 30.1 first contacts that container's outer-casing.

This lengthening occurs when the belt-storage roll 26 moves along the adjustment rail 29 against the pre-tension force. This adjustment in the length sets causes the belt speed to take on the value of the first belt-speed RIG1, which is slightly faster than the nominal belt speed RIG in the first transport section 30.1. As a result, there is no relative motion between the securing belt 23 and the containers 2. This promotes rotation-free transport of the containers along the second transport-section 30.2. Meanwhile, along the first transport section 30.1, the belt speed remains set at the nominal belt speed RIG, which corresponds to the circumferential speed of the transport star 4 at the tangent point TP with the radius R1.

Accordingly, as the arcuate path 21 fills with containers 2, the dynamic belt-storage unit 27 adjusts the length of the effective belt section 30 based on how many containers 2 are along the arcuate path 21. It does so in a way that avoids relative displacement between the star tips 4.4 and the first transport section 30.1 and the containers and the second transport section 30.2. This length adjustment promotes rotation-free transport of the containers 2 along the arcuate path 21 by ensuring that the effective belt-section 30 applies only a radial force and no circumferential force on a container 2.

At some point, the arcuate path 21 will have enough containers 2 so that the first transport-section 30.1 lifts off the transport star 4, thus coming free from the star tips 4.4, as shown in FIG. 4. Once the securing belt 23 lifts off the star tips 4.4, the belt speed increases in a region of the first transport section 30.1 increases to the second belt-speed speed RIG2, which is higher than the nominal belt speed RIG.

The detector 200 detects occurrence of this lift-off and notifies the central control unit 100, which then adjusts the drive 40 to adjust the belt speed at the first transport section 30.1. In particular, the control unit 100 accelerates the drive 40 to compensate causing this belt speed to take on the higher second belt-speed RIG2. Additionally, the drive 40 increases the nominal belt speed RIG to be equal to the first belt-speed RIG1, which corresponds to the circumferential speed of the transport star 4 at the tangent point TP with the third radius R3. In this case, the nominal belt speed RIG is lower than the second belt speed RIG2, which is lower than the first belt speed RIG1.

In addition, the belt storage-unit 27 carries out a more extensive length adjustment of the required path length of the effective belt section 30.

FIG. 5 shows the device 20 in a completely filled state of the arcuate path with containers 2. The belt storage unit 27 is in this situation deflected entirely against the pre-tension of the tensile spring 28, in order to release the necessary length of the effective belt section 30. The at least one securing belt 23 at this point of time already being accelerated, at least in the region of the effective belt section 30, to the increased first belt speed RIG1 by means of the controllable drive device 40, this speed corresponding to the circumferential speed of the transport star 4 at the tangent point TP with the third radius R3. This speed is reduced back to the nominal belt speed RIG only takes place when the arcuate path 21 has been emptied.

Figure 6:
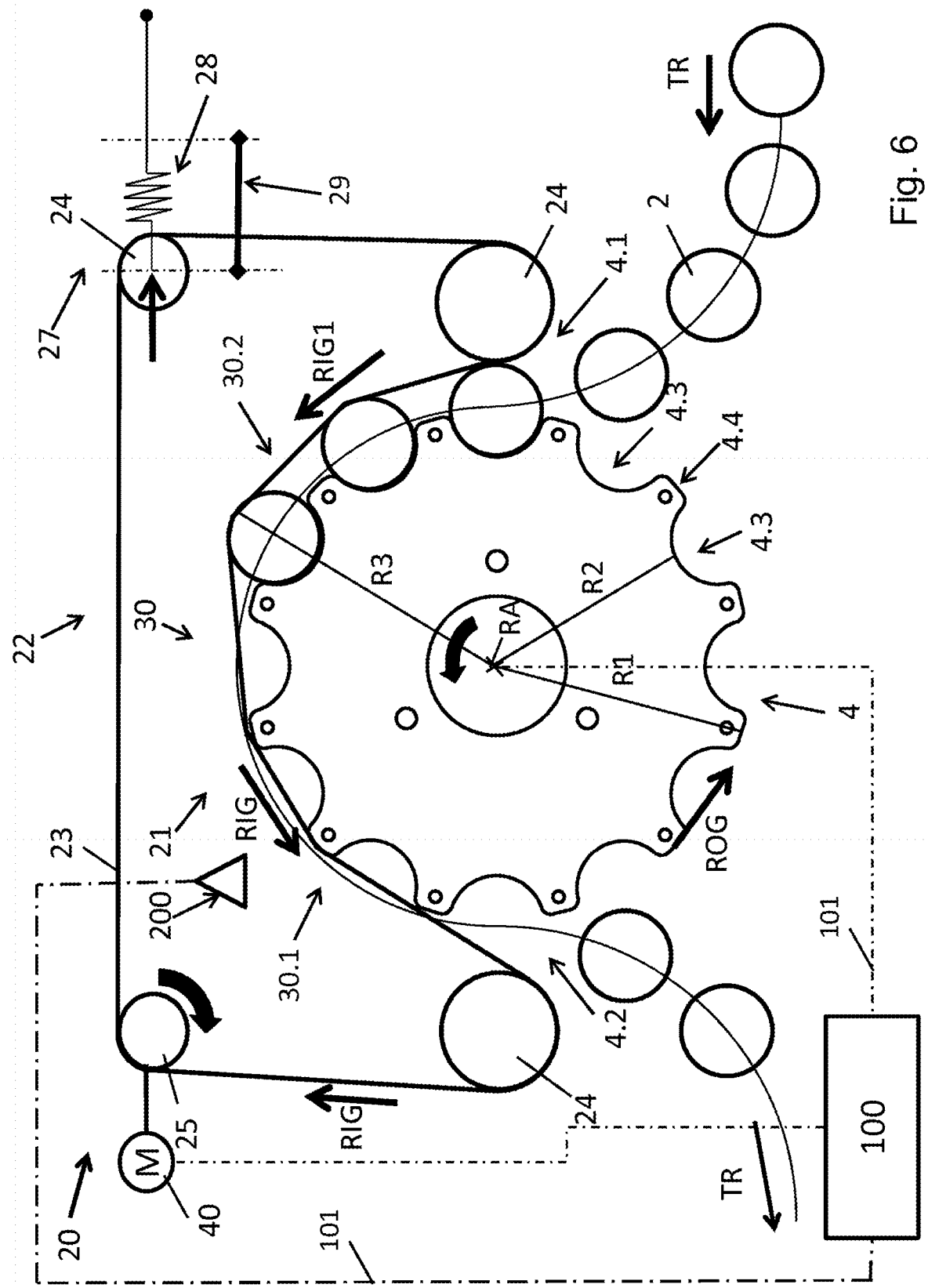
FIG. 6 shows the device shown in the preceding figures with the transport star in full drive mode and with some spaces.

FIG. 6 shows a partially filled arcuate path 21 in which the container flow between the container entrance 4.1 and container exit 4.2 has been briefly interrupted or disrupted such that some of the recesses 4 along the arcuate path 21 are not filled. In this case, as soon as a first unfilled recess 4.3 reaches the container exit 4.2, the drive 40 reduces the belt speed from the first belt-speed RIG1 to the nominal belt speed RIG. The belt-storage unit 27 carries out the length adjustment required for adjusting the speeds in the manner already described.

In other embodiments, as the first filled recess 4.3 reaches the container exit 4.2, the drive accelerates the securing belt 23 so that the belt speed rises from the nominal value RIG, which corresponds to the circumferential speed corresponding to the first radius R1, to a value associated with the third radius R3.

Figure 7:
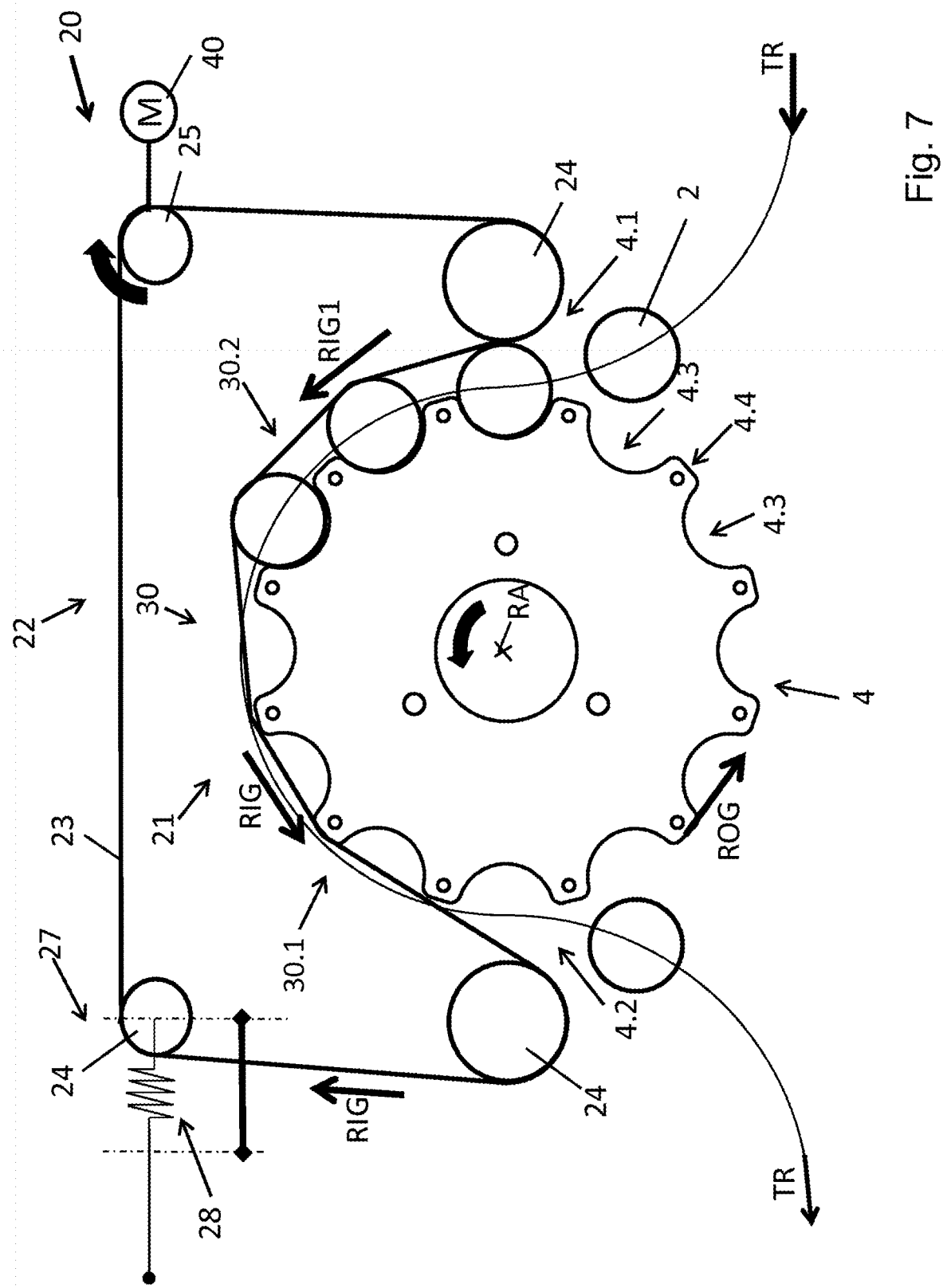
FIG. 7 shows an alternative to the embodiment shown in the preceding figures.

In the embodiments described thus far, the drive roller 25 lies upstream of the dynamic belt-storage unit 27. FIG. 7 shows an embodiment that reverses this orientation so that the drive roller 25 lies downstream of the dynamic belt-storage unit 27. All the elements referred to previously remain and functions take place as described. However, in the embodiment shown in FIG. 7, the drive roller 25 directly increases the belt speed at the second transport-section 30.2 and maintains a constant belt speed along the first transport section 30.1 by changing the location of the dynamic belt storage unit 27.

In an analogous manner, the dynamic belt storage unit 27 also changes its location to compensate for the speed change in the first transport section 30.1 wrought by having the securing belt 23 lift off from the transport star's surface.

The embodiments described herein feature only one deflection roller 24. Additional embodiments are those that have additional deflection rollers 24 and corresponding bearing mountings for those deflection rollers. Among these are embodiments with two additional deflection rollers 24. A preferred embodiment has three additional deflection rollers 24.

The embodiments described herein are representative only. However, all the embodiments rely on having least three deflections of the securing belt 23. It is understood that a large number of modifications or derivations are possible without thereby departing from the inventive concept on which the invention is based.

Having described the invention, and a preferred embodiment thereof, what is claimed as new and secured by Letters Patent is:

1. An apparatus for promoting rotation-free conveyance of containers along an arcuate path between a container entrance and a container exit, wherein said apparatus comprises a central controller, a transport star, a belt arrangement, a dynamic belt-storage unit, and wherein said transport star is drivable along a star rotation-axis thereof in a transport direction at a star-rotation speed, wherein said transport star comprises recesses on an outer circumference thereof for receiving said containers, wherein said belt arrangement comprises a securing belt and a drive that causes said securing belt to endlessly circulate at a drive speed when said dynamic belt-storage unit interacts with said belt arrangement, wherein said securing belt and said transport star face each other along said arcuate path such that said securing belt promotes rotation-free conveyance of containers being conveyed by said transport star along said arcuate transport path, wherein said securing belt comprises an effective belt-section having a second transport-section that rests on containers that are being propelled by said transport star along said arcuate path and, when said transport star has unoccupied recesses along said arcuate path, a first transport-section that faces said unoccupied recesses, wherein said drive causes said effective belt-section to move at a belt speed that is synchronous with said transport star's rotation, wherein said dynamic belt-storage unit causes an increase in belt speed when a portion of said belt that was resting on a container is released from said container, thereby maintaining rotation-free conveyance of said containers along said arcuate path, wherein said increase depends on the number of containers that face said second transport-section, wherein said central controller is configured to cause said drive to adjust a belt speed to maintain rotation-free transport of containers along said arcuate region either by adjusting a speed in said first transport-section when release of said first transport-section from said star causes a speed change of said belt or by adjusting a speed in said second transport-section when the number of containers facing said second transport-section changes, and wherein said dynamic belt-storage unit is configured to adjust belt speed in said first transport-section when a change of belt speed results from release of said securing belt from said transport star in said first transport-section, wherein said apparatus further comprises a detector for providing a signal indicative of activity of said securing belt at said effective belt-section, wherein said activity is a selected from the group consisting of contact of said securing belt at said first transport-section and release of said securing belt at said first transport-section, wherein said signal is used for controlling at least one of said drive and said dynamic belt-storage unit.

2. The apparatus of claim 1, wherein, in the region of the effective belt-section, the securing belt exerts a radial force on outer-casing surfaces of said containers and wherein said radial force has no circumferential component.

3. The apparatus of claim 1, wherein at least one of said first and second transport-sections has an extent that varies based on how many containers are being conveyed along said arcuate path and wherein said effective belt-section is formed by at least one of said first and second transport-sections.

4. The apparatus of claim 1, wherein, when said arcuate path has no containers, said first transport-section forms said effective belt-section, wherein said first transport-section contacts said transport star at least in some regions thereof, wherein said drive causes said first transport-section to move at a belt speed that is synchronized with a circumferential speed of said transport star at a first radius thereof, and wherein said first radius is an outer radius defined by the distance between said star rotation-axis and tangential points between adjacent recesses formed on the circumference of said star.

5. The apparatus of claim 1, wherein, during filling of said arcuate path with containers, said effective belt section is formed by a combination of said first transport section and said second transport section, wherein said drive causes said effective belt-section to move at a belt speed that in synchrony with a circumferential speed of said transport star at a first radius thereof, wherein said first radius is an outer radius defined by the distance between said star rotation-axis and tangential points between adjacent recesses formed on said star's circumference.

6. The apparatus of claim 1, wherein, during filling of said arcuate path with containers, said dynamic belt-storage unit dynamically adjusts an extent of said effective belt-section to cause a marginal increase said securing belt's belt speed.

7. The apparatus of claim 1, wherein said central controller is configured to cause said drive to adjust a speed of said effective belt-section radial to said star rotation-axis when said securing belt is raised in a region of said first transport-section from those surfaces that said securing belt rested upon prior to being so raised.

8. The apparatus of claim 1, wherein, when said arcuate path is completely filled with containers, said second transport-section forms said effective belt-section, wherein said drive causes said effective belt-section to move at a belt speed that is synchronized with a circumferential speed of said transport star at distance that is as far from said star rotation-axis as it is possible to be while still being on a container.

9. A method of promoting rotation-free transfer of containers along an arcuate path between a container entrance and a container exit, said method comprising driving a transport star along a star rotation-axis thereof in a transport direction at a star-rotation speed, receiving containers in recesses disposed along an outer circumference of said transport star, in response to an interaction between a dynamic belt storage-unit and a belt arrangement, causing a securing belt of said belt arrangement to endlessly circulate at a drive speed, said securing belt including an effective belt section, wherein causing said securing belt of said belt arrangement to endlessly circulate at said drive speed comprises receiving a signal from a detector, said signal being indicative of activity of said securing belt at an effective belt-section, wherein said activity is a selected from the group consisting of contact of said securing belt at said first transport-section and release of said securing belt at said first transport-section, and using said signal for controlling at least one of said drive speed and said dynamic belt-storage unit, wherein said securing belt and said transport star face each other along said arcuate path such that said securing belt promotes rotation-free conveyance of containers being conveyed by said transport star along said arcuate transport path, wherein said effective belt-section includes first and second transport-sections, wherein said second transport-section rests on containers that are being propelled by said transport star along said arcuate path and, when said transport star has unoccupied recesses along said arcuate path, said first transport-section faces said unoccupied recesses, said method further comprising driving said effective belt-section to move at a belt speed that is synchronous with said transport star's rotation, wherein said dynamic belt-storage unit causes an increase in belt speed when a portion of said belt that was resting on a container is released from said container, thereby maintaining rotation-free conveyance of said containers along said arcuate path, wherein said increase depends on the number of containers that face said second transport-section, said method further comprising adjusting a belt speed to maintain rotation-free transport of containers along said arcuate region either by adjusting a speed in said first transport-section when release of said first transport-section from said star causes a speed change of said belt or by adjusting a speed in said second transport-section when the number of containers facing said second transport-section changes, and wherein said dynamic belt-storage unit is configured to adjust belt speed in said first transport-section when a change of belt speed results from release of said securing belt from said transport star in said first transport-section.

10. The method of claim 9, further comprising, in response to said arcuate path being in an empty state, driving said securing belt such that said effective belt-section contacts said transport star at a belt speed that is synchronized with said star-rotation speed.

11. The method of claim 9, wherein, during filling of said arcuate path with containers, causing said securing belt to move at a belt speed that is synchronized with said star-rotation speed, and using said dynamic belt-storage unit to adjust a length of a second transport-section of said effective belt-section based on how many containers are in said arcuate path and to increase a speed of said second transport-section.

12. The method of claim 9, further comprising increasing belt speed following complete release of said effective belt-section from said transport star.

13. The method of claim 9, wherein said arcuate path is empty and wherein said method further comprises operating said securing belt at a belt speed that corresponds to said star-rotation speed such that, along said arcuate path, no relative movement takes place between said transport star and said effective belt section in contact with the transport star in said region.

14. The method of claim 9, further comprising, in response to said arcuate path being empty, operating said securing belt at a belt speed that corresponds to a circumferential speed of said transport star at a first radius, wherein said first radius is an outer radius defined by the distance between said star rotation-axis and tangential points between adjacent recesses formed on said star's circumference.

15. The method of claim 9, further comprising, while said arcuate path is being filled with containers, continuing to drive said securing belt at a belt speed that corresponds to a circumferential speed of said transport star at a first radius, wherein said first radius is an outer radius defined by the distance between said star rotation-axis and tangential points between adjacent recesses formed on said star's circumference.

16. The method of claim 9, further comprising, while filling said arcuate path with containers, using said dynamic belt-storage unit to dynamically adjust a length of said effective belt-section to cause an increase in belt speed at said second transport-section.

17. The method of claim 16, further comprising, while filling said arcuate path with containers, causing said drive to interact with said dynamic belt-storage unit to dynamically adjust a length of said effective belt-section to increase belt speed at said second transport-section and to maintain constant belt speed in said first transport-section, wherein said interaction comprises changing a location of said dynamic belt-storage unit.

18. The method of claim 9, wherein said arcuate path is completely occupied by said containers and wherein said method further comprises causing said securing belt to move at a belt speed that corresponds to said containers' circumferential speed.

\* \* \* \* \*